(12) United States Patent
Konno

(10) Patent No.: US 7,855,470 B2
(45) Date of Patent: Dec. 21, 2010

(54) IMMOBILIZER DEVICE AND MOTORCYCLE INCLUDING SAME

(75) Inventor: Takeshi Konno, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 265 days.

(21) Appl. No.: 12/286,682

(22) Filed: Oct. 1, 2008

(65) Prior Publication Data
US 2009/0091185 A1 Apr. 9, 2009

(30) Foreign Application Priority Data
Oct. 4, 2007 (JP) .............................. 2007-260903

(51) Int. Cl.
*B60R 25/04* (2006.01)
(52) U.S. Cl. .................................................... 307/10.3
(58) Field of Classification Search ................ 307/10.2, 307/10.5; 340/5.72; 701/70; 180/287
See application file for complete search history.

(56) References Cited

U.S. PATENT DOCUMENTS

| 6,144,113 | A | 11/2000 | Hayashi et al. |
| 7,402,920 | B2 * | 7/2008 | Kamiya ...................... 307/10.6 |
| 2004/0046452 | A1 * | 3/2004 | Suyama et al. ............. 307/10.2 |
| 2006/0022795 | A1 * | 2/2006 | Nakamura et al. ......... 340/5.61 |
| 2006/0152348 | A1 * | 7/2006 | Ohtaki et al. ............ 340/426.1 |

FOREIGN PATENT DOCUMENTS

JP 2000-108848 4/2000

* cited by examiner

*Primary Examiner*—Jared J Fureman
*Assistant Examiner*—Daniel Cavallari
(74) *Attorney, Agent, or Firm*—Carrier Blackman & Associates, P.C.; Joseph P. Carrier; William D. Blackman

(57) ABSTRACT

An immobilizer device for a vehicle includes a key which has a transponder, an engine ECU, and an immobilizer ECU which receives a first identification information transmitted from the key and inputs the identification information to the engine ECU via a first identification information transmitting device. The immobilizer ECU includes a second identification information transmitting device which inputs second, different identification information to the engine ECU. The engine ECU includes a first and second identification information authentication devices which respectively authenticate the first identification information and the second identification information based on first and second comparison data set in the engine ECU. The engine ECU allows an engine to start when the first and second identification information are appropriately authenticated. The first identification information is based on random numbers generated by the engine ECU.

20 Claims, 4 Drawing Sheets

IMMOBILIZER DEVICE AND MOTORCYCLE INCLUDING SAME

CROSS-REFERENCE TO RELATED APPLICATIONS

The present application claims priority under 35 USC §119 based on Japanese patent application No. 2007-260903, filed on Oct. 4, 2007. The entire subject matter of this priority document is incorporated by reference herein.

BACKGROUND OF THE INVENTION

1. Field of the Invention

The present invention relates to an immobilizer device for a vehicle or the like, and more particularly to such an immobilizer device which can rapidly authenticate a password without using a high-speed CPU.

2. Description of the Background Art

There is known an immobilizer device which is used as a vehicle theft prevention device. Generally, the immobilizer device is constituted of a key which incorporates a transponder (transmitter/responder) therein, an immobilizer ECU and an engine ECU. When electricity is supplied to the immobilizer device, the immobilizer ECU transmits a request signal which contains random numbers to the key. When the key transponder receives the random numbers, the transponder generates a password by using the received random numbers and a functional formula and transmits the password to the immobilizer ECU. The immobilizer ECU collates by comparison a password relating to the random numbers which were transmitted by the immobilizer ECU with the password received from the transponder. Further, when it is determined that these passwords agree with each other as a result of the collation, the immobilizer ECU inputs preset simple identification information (ID) to the engine ECU. The engine ECU stores an ID which is identical with the ID preset in the immobilizer ECU. When it is determined that these IDs agree with each other as a result of the collation, the engine ECU starts a scheduled fuel supply control and ignition control. When it is determined that the password is wrong as the result of the password collation by the immobilizer ECU, the ID is not inputted to the engine ECU from the immobilizer ECU and hence, the fuel supply control and the ignition control are inhibited whereby starting of an engine is not permitted.

With respect to the above-mentioned known background art, for further enhancing the security performance, it is preferable to perform the collation of passwords between the immobilizer ECU and the engine ECU. An immobilizer device which performs the collation of passwords between an immobilizer ECU and an engine ECU as a second stage of authentication is disclosed in JP-A-2000-108848, for example.

However, the two-stage authentication in which the collation of passwords is performed between a key transponder and the immobilizer ECU and, at the same time, the collation of passwords is also performed between the immobilizer ECU and the engine ECU has a drawback that it takes time until the engine assumes an engine start permission state after an ON operation of an ignition switch is performed. Although it may be possible to mount a high speed CPU on the immobilizer ECU for shortening the password collation time, mounting of the high-speed CPU will likely increase the cost of the immobilizer device.

Therefore, it is therefore an object of the present invention to provide an immobilizer device which can overcome the above-mentioned drawbacks and can enhance the theft prevention performance of a vehicle without using a high-speed CPU.

SUMMARY OF THE INVENTION

To overcome the above-mentioned drawbacks, according to a first aspect of the present invention there is provided an immobilizer device comprising: a key including a transponder; an engine ECU; and an immobilizer ECU which receives first identification information transmitted from the key and inputs the first identification information to the engine ECU; wherein the immobilizer ECU includes a second identification information transmitting device which inputs second identification information different from the first identification information to the engine ECU; the engine ECU includes a first identification information authentication device which authenticates the first identification information and a second identification information authentication device which authenticates the second identification information; and the engine ECU is configured to allow an engine to start when the first identification information authenticated by the first identification information authentication device agrees with first comparison data corresponding to the first identification information which is set in the engine ECU and the second identification information authenticated by the second identification information authentication device agrees with second comparison data corresponding to the second identification information which is set in the engine ECU.

The present invention according to a second aspect thereof provides that the engine ECU includes a request signal transmitting device which inputs a request signal containing random numbers to the immobilizer ECU, the immobilizer ECU includes a transmitting device which transmits the request signal, the key further includes a password generation device which generates the first identification information as a function of the random numbers when the transponder receives the request signal containing the random numbers, and the first identification information authentication device of the engine ECU is configured to authenticate the first identification information generated as the function of the random numbers.

The present invention according to a third aspect thereof provides that the engine ECU includes a first collation part which authenticates the first identification information containing a password generated as a function of the random numbers and a second collation part which authenticates the second identification information containing an ID password which is a fixed value.

Further, the present invention according to a fourth aspect thereof provides that the immobilizer device is configured such that the request signal, the first identification information and the second identification information are transmitted between the engine ECU and the immobilizer ECU via a single serial communication line.

According to the arrangement defined in the first aspect thereof, the authentication of the first identification information is performed by inputting the first identification information generated by the key to the engine ECU via the immobilizer ECU. Accordingly, if a person attempting to steal a vehicle including the immobilizer device were (for example) to replace the key 19 and the immobilizer ECU 18 with a different key and immobilizer ECU, the password collation between the replacement parts and the engine ECU 10 would not be successful, and the vehicle's engine would be prevented from operating. Accordingly, the security performance can be enhanced.

Further, even when the authentication of the first identification information is successfully performed, the authentication of the second identification information is performed between the immobilizer ECU and the engine ECU, and starting of the engine is not permitted unless the correct second identification information is confirmed, whereby it is possible to ensure the high security performance.

According to the arrangement defined in the second aspect thereof, the first identification information is generated by the key based on the random numbers generated by the engine ECU as the function of the random numbers and, hence, it is possible to allow the engine ECU to perform the sophisticated authentication of the first identification information. Compared to a case in which a first authentication involving random numbers is performed between a key and an immobilizer ECU and a second authentication involving random numbers is also performed between the immobilizer ECU and the engine ECU, the sophisticated authentication according to the present invention using the random numbers is performed only one time and, hence, time required from the key operation to starting of the engine can be shortened. Further, the authentication which is performed one time is performed between the key and the engine ECU and, hence, it is possible to maintain the high security performance.

According to the arrangement defined in the third aspect thereof, wherein the second identification information contains an ID password which is a fixed value, the plurality of passwords can be collated by collation parts dedicated to the respective passwords and the two-stage password collation can be simplified thus reducing a calculation burden imposed on the engine ECU.

According to the arrangement defined in the fourth aspect thereof, a transmission line for the request signal, the first identification information and the second identification information between the immobilizer ECU and the engine ECU is formed of the single serial communication line and, hence, wiring is facilitated. Particularly, in a motorcycle which is difficult to ensure a space for the immobilizer device, the degree of freedom in mounting layout of the immobilizer device can be enhanced.

DETAILED DESCRIPTION OF ILLUSTRATIVE EMBODIMENTS

It should be understood that only structures considered necessary for illustrating selected embodiments of the present invention are described herein. Other conventional structures, and those of ancillary and auxiliary components of the system, will be known and understood by those skilled in the art.

Figure 2:
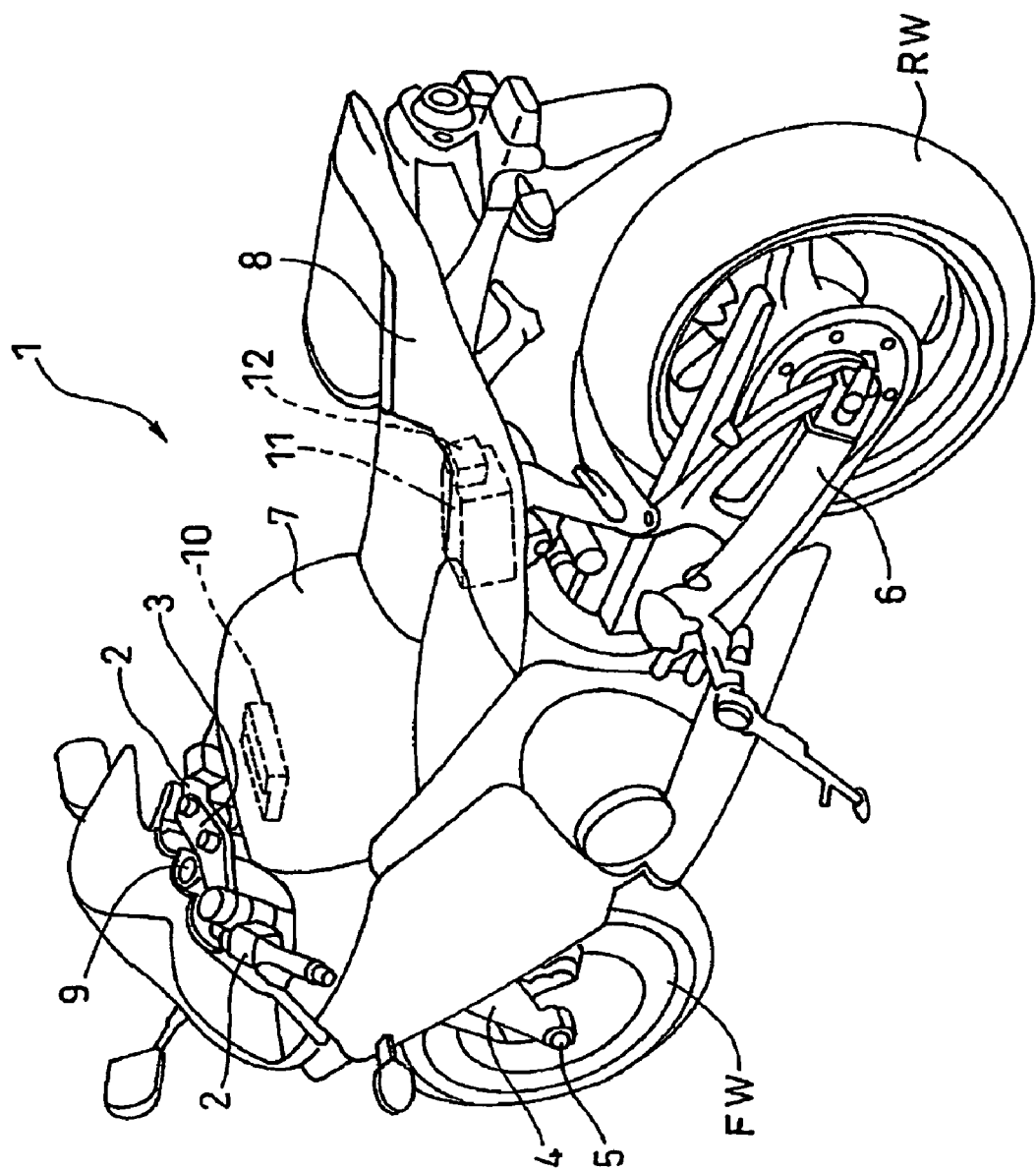
FIG. 2 is a perspective view of a motorcycle on which the immobilizer device according to the first exemplary embodiment of the present invention is mounted.

Hereinafter, a first exemplary embodiment of the present invention is explained in conjunction with drawings. FIG. 2 is a perspective view of a motorcycle provided with an immobilizer device according to a first exemplary embodiment of the present invention as viewed from a left rear side of the motorcycle. Although the motorcycle 1 shown in FIG. 2 is a sport-type motorcycle, a vehicle to which the present invention is applicable is not limited to the sport-type motorcycle. On a frontmost portion of a vehicle body frame, a top bridge 3 on which a steering handle 2 is mounted and a front-wheel support portion including a pair of front forks 4 which extends in the downward and frontward direction from left and right sides of the top bridge 3 are mounted. A front wheel FW is mounted on a lower end of the front fork 4 by way of a front-wheel axle 5.

A rear wheel RW is supported on a swing arm 6 which is vertically swingably mounted on a vehicle body frame. A fuel tank 7 is mounted on a rear upper portion of the front fork 4, while a pillion seat 8 is arranged behind a fuel tank 7.

An ignition switch unit 9 is mounted on the top bridge 3. The ignition switch unit 9 is formed of an integral body consisting of a main switch and an immobilizer ECU. The detail of the constitution of the ignition switch unit 9 is described later. An engine ECU 10 is arranged below the fuel tank 7.

In this manner, the engine ECU 10 is arranged more inside of the vehicle than the immobilizer ECU in many cases and, hence, by performing the password collation by the engine ECU 10, the security performance can be enhanced compared to a case in which the authentication of the password is performed by the immobilizer ECU. A battery 11 and a main fuse 12 are arranged below the pillion seat 8.

Figure 3:
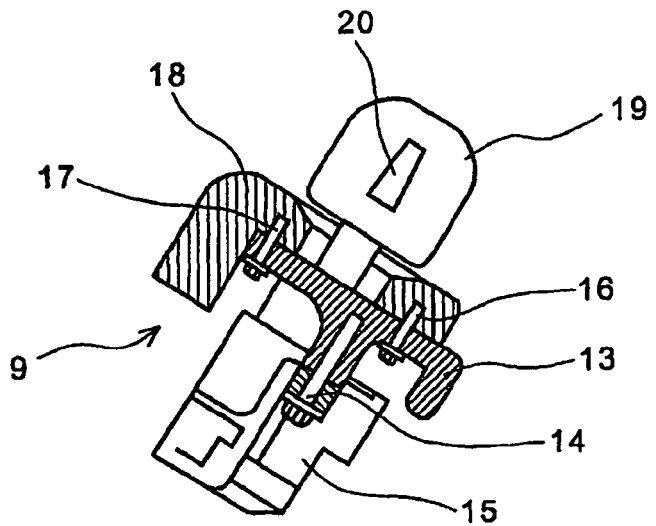
FIG. 3 is a cross-sectional view of a main switch unit according to the first exemplary embodiment of the present invention.

FIG. 3 is a cross-sectional view of a main switch unit 9. The main switch unit 9 includes a main switch 15 which is fixed to a mounting bracket 13 using bolts 14 and the immobilizer ECU 18 which is mounted on an upper surface of the mounting bracket 13 and is fixed to the mounting bracket 13 using bolts 16, 17. The immobilizer ECU 18 is housed in an annular casing, and a key 19 is detachably inserted into a main switch 15 while penetrating a center hole formed in the annular casing. The mounting bracket 13 is mounted on the top bridge 3 of the motorcycle 1, for example. The main switch 15 includes, for example, a power-supply turn-off position, a power-supply turn-on position, and a start position.

The key 19 incorporates a transponder 20 therein, and the immobilizer ECU 18 includes a transmission/reception antenna and a transmission/reception circuit. The transmission/reception antenna and the transmission/reception circuit are described later.

Figure 4:
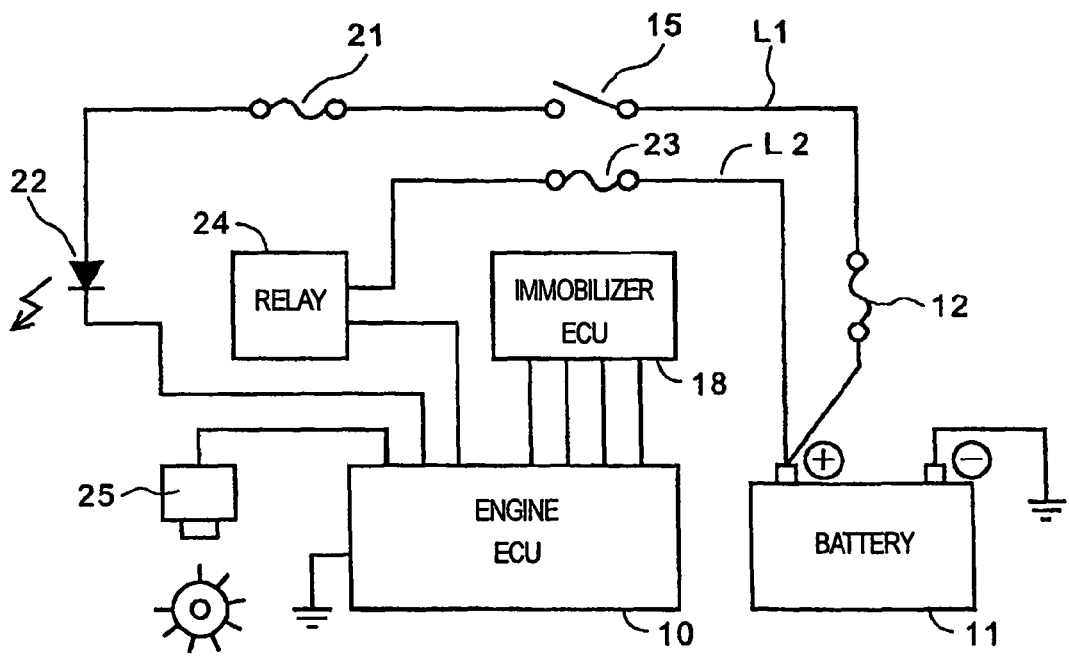
FIG. 4 is a system wiring diagram of the immobilizer device according to the first exemplary embodiment of the present invention.

FIG. 4 is a system wiring diagram of the immobilizer device. In FIG. 4, the engine ECU 10 performs a fuel supply control and an ignition control of an engine which constitutes a drive source of the motorcycle 1. On a line L1 which connects the battery 11 and the engine ECU 10, the main fuse 12, the main switch 15, a fuse 21 and an immobilizer indication lamp (for example, a light emitting diode) 22 are arranged in series. Apart from the line L1, a line L2 which connects the battery 11 and the engine ECU 10 is provided, and an engine ECU fuse 23 and an engine stop relay 24 are arranged on the line L2 in series. The immobilizer ECU 18 is connected to the engine ECU 10. A crank pulse generator 25 which detects a crankangle of the engine is connected to the engine ECU 10.

In the arrangement shown in FIG. 3 and FIG. 4, when an ON operation of the main switch 15 is performed by rotation of the key 19, for example, power source is supplied to the engine ECU 10 from the battery 11 and the immobilizer indication lamp 22 is turned on. When the power source is supplied to the engine ECU 10, the engine ECU 10 performs the communication with the key 19 via the immobilizer ECU 18 thus performing the authentication of passwords described later (first identification information). Further, between the immobilizer ECU 18 and the engine ECU 10, the authentication of scheduled ID (second identification information) is performed. In authentication steps of the password and the ID, when results of the respective authentications are determined to be affirmative, the engine ECU 10 is allowed to perform an ignition control and a fuel supply control for starting the engine. In performing the ignition control and the fuel supply control, a pulse signal inputted from the crank pulse generator 25 is used. The engine stop relay 24 interrupts the supply of electricity to the engine ECU 10 from the battery 11 in emergency or the like thus stopping the engine.

On the other hand, when the result of the authentication is negative, the engine ECU 10 stops the supply of electricity to an ignition coil and/or stops the supply of fuel to the engine thus inhibiting starting of the engine.

Figure 1:
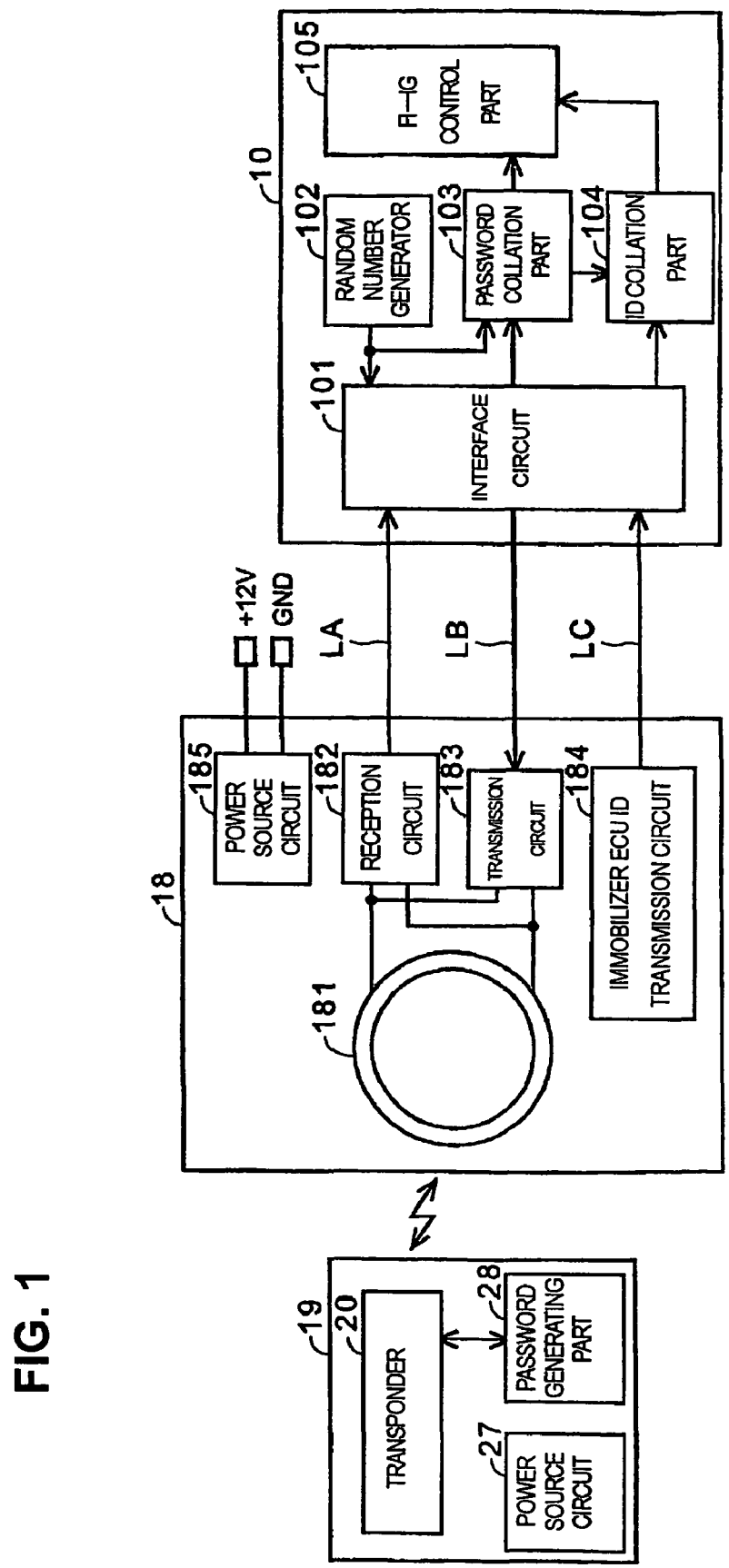
FIG. 1 is a block diagram showing functions of main parts of an immobilizer device according to a first exemplary embodiment of the present invention.

FIG. 1 is a block diagram showing a main part of the immobilizer device. As shown in FIG. 1, the immobilizer device comprises the immobilizer ECU 18, the engine ECU 10 and the key 19. The immobilizer ECU 18 includes an antenna 181, a reception circuit 182, a transmission circuit 183, an immobilizer ECU ID transmission circuit (second identification information transmitting means) 184, and a power source circuit 185.

The engine ECU 10 includes an interface circuit 101, a random number generator 102, a password collation part (first identification information authentication device) 103, an ID collation part (second identification information authentication device) 104, and an FI-IG control part 105. The password collation part 103 and the ID collation part 104 are respectively constituted of a microprocessor (including a CPU and a memory).

The key 19 includes a power source circuit 27 and a password generating part 28 along with the transponder 20 described previously. The power source circuit 27 may include a coil which receives electric waves from the immobilizer ECU 18 and a capacitor which rectifies an electric current generated by the coil and stores the electric current as DC power therein. However, the power source circuit 27 may include a battery. The password generating part 28 includes an arithmetic operation circuit which calculates a password code based on a random number code transmitted from the engine ECU 10.

A voltage of +12V is applied to the power source circuit 185 of the immobilizer ECU 18 from the battery 11 via the main switch 15, and the power source circuit 185 supplies an electric current to the reception circuit 182, the transmission circuit 183 and the immobilizer ECU ID transmission circuit 184. Here, a voltage may be applied to the power source circuit 185 from the battery 11 via the engine ECU 10.

Three lines may be provided between the immobilizer ECU 18 and the engine ECU 10. The first line is a line LA which connects the reception circuit 182 and the interface circuit 101, the second line is a line LB which connects the transmission circuit 183 and the interface circuit 101, and the third line is a line LC which connects the immobilizer ECU ID transmission circuit 184 and the interface circuit 101.

The manner of operation of the immobilizer device shown in FIG. 1 is explained. First of all, in the engine ECU 10, the random number generator 102 generates the random numbers. The random numbers are inputted to the interface circuit 101 and the password collation part 103. The interface circuit 101 puts the inputted random numbers into a request signal and inputs the request signal to the immobilizer ECU 18 via the line LB. The password collation part 103 calculates a password (first comparison data) based on the inputted random numbers and a preset function.

The immobilizer ECU 18 transmits the inputted request signal using the transmission circuit 183 and the antenna 181.

When the power source circuit 27 of the key 19 which may include the coil and the capacitor receives electric waves from the immobilizer ECU 18, electric power generated in the coil by the electric waves is stored in the capacitor and is used as a power source for the transponder 20 and the password generating part 28. The transponder 20 receives the request signal transmitted from the immobilizer ECU 18, and the received request signal is inputted to the password generating part 28. The password generating part 28 samples the random numbers contained in the request signal and calculates/generates a password by, for example, inputting the random numbers to a function prestored in the password generating part 28. This function is equal to or the same as the function which is used in calculating the password by the password collation part 103 of the engine ECU 10. The calculated password is transmitted by the transponder 20.

The immobilizer ECU 18 receives the password transmitted from the key 19 by the reception circuit 182 using the antenna 181. The received password is inputted to the interface circuit 101 of the engine ECU 10 via the line LA. The interface circuit 101 inputs the password inputted from the immobilizer ECU 18 to the password collation part 103. The password collation part 103 collates the password inputted from the interface circuit 101 and the password (first comparison data) calculated based on the random numbers generated at the time of transmitting the request signal.

In the immobilizer ECU ID transmission circuit 184, the immobilizer ECU ID which is a fixed value (for example, data of 16 bits) is prestored. When the power source is supplied to the immobilizer ECU ID transmission circuit 184, the immobilizer ECU ID transmission circuit 184 inputs the immobilizer ECU ID to the interface circuit 101 of the engine ECU 10 via the line LC. The interface circuit 101 has a memory function of storing the inputted immobilizer ECU ID.

When the passwords agree with each other in the collation result of the passwords by the password collation part 103, the password collation part 103 of the engine ECU 10 inputs an agreement signal to the ID collation part 104. In response to the agreement signal, the ID collation part 104 collates the immobilizer ECU ID inputted and stored in the interface circuit 101 and an inner ID (second comparison data) prestored in the ID collation part 104 by comparison. When the inner ID and the immobilizer ECU ID agree with each other as a result of collation by the ID collation part 104, a permission signal is inputted to the FI-IG control part 105. When the inner ID and the immobilizer ECU ID do not agree with each other as the result of collation by the ID collation part 104, the ID collation part 104 inputs a non-permission signal indicative of the disagreement to the FI-IG control part 105.

When the passwords do not agree with each other in the result of the collation in the password collation part 103, the password collation part 103 inputs a non-permission signal to the FI-IG control part 105.

The FI-IG control part 105 may include well-known fuel injection control and ignition control functions. When the permission signal is inputted, the control function is activated and hence, the FI-IG control part 105 performs a control of a fuel injection quantity, injection timing and an ignition time using predetermined parameters in response to a state of the engine or a traveling state of the vehicle. On the other hand, when the non-permission signal is inputted, the fuel injection control and the ignition control performed by the FI-IG control part 105 are inhibited.

In this manner, according to this exemplary embodiment, since the password collation is performed between the key 19 and the engine ECU 10 via the immobilizer ECU 18, if a person attempting to steal a vehicle including the immobilizer device were (for example) to replace the key 19 and the immobilizer ECU 18 with a different key and immobilizer ECU, the password collation between the replacement parts and the engine ECU 10 would not be successful, and the vehicle's engine would be prevented from operating. Accordingly, the security performance can be enhanced.

Further, the ID collation can be easily performed by merely collating the fixed ID between the immobilizer ECU 18 and the engine ECU 10 by comparison. On the other hand, the key 19 and the engine ECU 10 can ensure the high security performance by performing the password collation which uses the random numbers. In this manner, out of the two-stage collation, the password collation using the random numbers which takes a relatively longer time can be performed in one stage and, hence, the engine can assume a starting possible state in accordance with collation steps which can be performed within a short time.

In this exemplary embodiment, the immobilizer ECU ID transmission circuit 184 preliminarily inputs the immobilizer ECU ID to the interface circuit 101, and when the collation in the password collation part 103 is affirmative, the immobilizer ECU ID is read in the ID collation part 104 from the interface circuit 101. However, the processing is not limited to such processing. That is, when the collation in the password collation part 103 is affirmative, a request signal may be supplied to the immobilizer ECU from the engine ECU 10 side to request the transmission of the immobilizer ECU ID.

Figure 5:
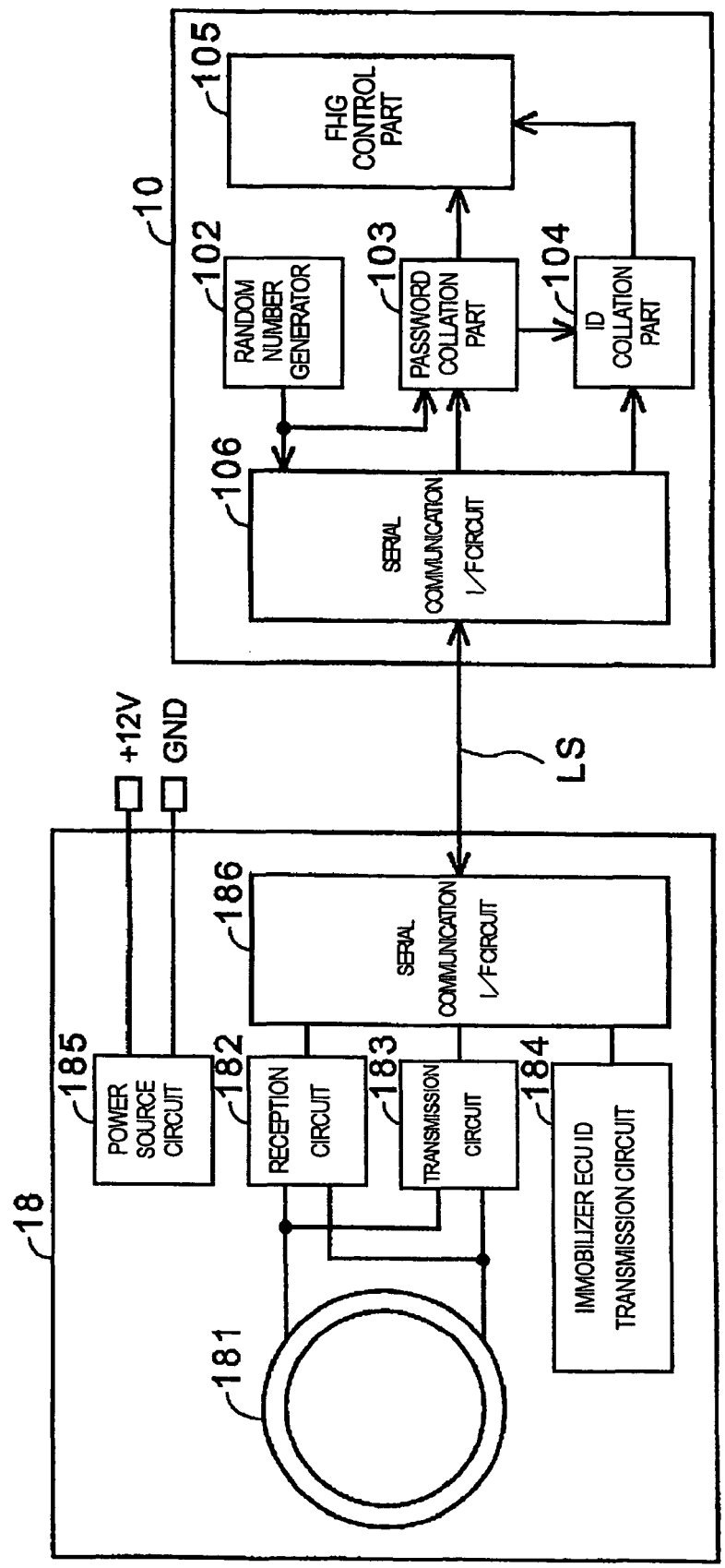
FIG. 5 is a block diagram showing functions of main parts of an immobilizer device according to a second exemplary embodiment of the present invention.

Next, a second exemplary embodiment of the present invention is explained. FIG. 5 is a functional block diagram of essential parts according to the second exemplary embodiment. In the drawing, the same symbols indicate parts identical with or similar to the parts shown in FIG. 1. In FIG. 5, both of the engine ECU 10 and the immobilizer ECU 18 respectively have serial communication interface circuits 106 and 186, and the transmission of the request signal to the immobilizer ECU 18 from the engine ECU 10 and the transmission of the password and the immobilizer ECU ID to the engine ECU 10 from the immobilizer ECU 18 are performed via one serial communication line LS which connects the serial communication interface circuits 106 and 186. As a communication protocol between the serial communication interface circuits 106 and 186, CAN, LIN, ISO-9141 or the like may preferably be used.

According to the second exemplary embodiment, the communication between the immobilizer ECU 18 and the engine ECU 10 can be performed using one communication line and hence, the wiring between the ECUs can be simplified.

In the above-mentioned exemplary embodiments, the password which is used in the communication between the key and the engine ECU is acquired by function calculation based on the numerical values using the random values. However, the generation of password is not limited to the use of the random values, and the password may be generated in other manners, e.g., by putting regularly changing numerical values into a function formula.

Further, the key 19 is not limited to a key which transmits the password generated by using the received random numbers. For example, the key 19 may generate a fixed key ID in response to a request signal (containing no random numbers) transmitted from the immobilizer ECU 18, and the immobilizer ECU 18 may input the key ID to the engine ECU 10. In this case, the password collation part 103 of the engine ECU 10 is modified to collate the fixed key ID. The immobilizer device modified in this manner can also perform the two-stage collation, and inhibits starting of the engine when the key and the immobilizer ECU are replaced.

Although a number of selected embodiments of the invention have been described herein, the foregoing description is intended to illustrate, rather than to limit the invention. Those skilled in the art will realize that many modifications of the illustrative embodiments could be made which would be operable. All such modifications, which are within the scope of the claims, are intended to be within the scope and spirit of the present invention.

What is claimed is:

1. An immobilizer device comprising:
a transponder
a key which incorporates the transponder;
an engine ECU; and
an immobilizer ECU which receives a first identification information transmitted from the key and inputs the first identification information to the engine ECU; wherein
the immobilizer ECU includes a second identification information transmitting device which inputs a second identification information to the engine ECU,
the engine ECU includes a first identification information authentication device which authenticates the first identification information based on a first comparison data set in the engine ECU corresponding to the first identification information, and a second identification information authentication device which authenticates the second identification information based on a second comparison data set in the engine ECU corresponding to the second identification information, and
the engine ECU is configured to allow an engine to start when the first identification information is authenticated as agreeing with the first comparison data and the second identification information authenticated by the second identification information is authenticated as agreeing with the second comparison data.

2. An immobilizer device according to claim 1, wherein the engine ECU further includes a request signal transmitting device which inputs a request signal containing random numbers to the immobilizer ECU,
the immobilizer ECU further includes a transmitting device which transmits the request signal,
the key further includes a password generation device which receives the request signal containing the random numbers and generates the first identification information as a function of the random numbers, and
the first identification information authentication device of the engine ECU is configured to authenticate the first identification information generated as the function of the random numbers.

3. An immobilizer device according to claim 2, wherein the first identification information authentication device includes a first collation part which authenticates the first identification information containing a password consisting of random numbers and the second identification information authentication device includes a second collation part which authenticates the second identification information containing an ID password which is a fixed value.

4. An immobilizer device according to claim 2, wherein the immobilizer device is configured such that the request signal, the first identification information and the second identification information are transmitted between the engine ECU and the immobilizer ECU via a single serial communication line.

5. An immobilizer device according to claim 3, wherein the immobilizer device is configured such that the request signal, the first identification information and the second identification information are transmitted between the engine ECU and the immobilizer ECU via a single serial communication line.

6. An immobilizer device according to claim 1, wherein the key also includes a power source.

7. An immobilizer device according to claim 6, wherein the power source is a battery.

8. An immobilizer device according to claim 6, wherein the power source includes a coil which receives electric waves from the immobilizer ECU and a capacitor which rectifies an electric current generated by the coil and stores the electric current as DC power therein.

9. An immobilizer device according to claim 1, wherein the immobilizer ECU is adapted to be disposed with an ignition switch unit near a top bridge of a motorcycle, and the engine ECU is adapted to be disposed inwardly of the vehicle nearer to an engine of the vehicle than the immobilizer ECU.

10. A vehicle including an engine and an immobilizer device, the immobilizer device comprising:
a transponder
a key which incorporates the transponder;
an engine ECU; and
an immobilizer ECU which receives a first identification information transmitted from the key and inputs the first identification information to the engine ECU; wherein
the immobilizer ECU includes a second identification information transmitting device which inputs a second identification information to the engine ECU,
the engine ECU includes a first identification information authentication device which authenticates the first identification information based on a first comparison data set in the engine ECU corresponding to the first identification information, and a second identification information authentication device which authenticates the second identification information based on a second comparison data set in the engine ECU corresponding to the second identification information, and
the engine ECU is configured to allow the engine to start when the first identification information is authenticated as agreeing with the first comparison data and the second identification information authenticated by the second identification information is authenticated as agreeing with the second comparison data.

11. The vehicle according to claim 10, wherein the engine ECU further includes a request signal transmitting device which inputs a request signal containing random numbers to the immobilizer ECU,
the immobilizer ECU further includes a transmitting device which transmits the request signal,
the key further includes a password generation device which receives the request signal containing the random numbers and generates the first identification information as a function of the random numbers, and
the first identification information authentication device of the engine ECU is configured to authenticate the first identification information generated as the function of the random numbers.

12. The vehicle device according to claim 11, wherein the first identification information authentication device includes a first collation part which authenticates the first identification information containing a password consisting of random numbers and the second identification information authentication device includes a second collation part which authenticates the second identification information containing an ID password which is a fixed value.

13. The vehicle device according to claim 11, wherein the immobilizer device is configured such that the request signal, the first identification information and the second identification information are transmitted between the engine ECU and the immobilizer ECU via a single serial communication line.

14. The vehicle device according to claim 10, wherein the key also includes a power source.

15. The vehicle device according to claim 10, wherein the vehicle is a motorcycle, the immobilizer ECU is disposed with an ignition switch unit near a top bridge of the motorcycle, and the engine ECU is disposed inwardly of the motorcycle nearer to the engine than is the immobilizer ECU.

16. An immobilizer device, comprising:
a key, which includes a power source, a password generating device, and a transponder;
an immobilizer ECU which is connected to a power source and includes an antenna, a reception circuit, a first transmission circuit, and a second transmission circuit; and
an engine ECU which includes an interface circuit, a random number generator, a first collation device, a second collation device, and a controller; wherein
the immobilizer ECU receives a first identification information transmitted from the key and inputs the first identification information to the engine ECU;
the second transmission circuit of the immobilizer ECU inputs a second identification information to the engine ECU,
the first collation device of the engine ECU authenticates the first identification information and the second collation device which authenticates the second identification information, and
the engine ECU is configured to allow an engine to start when the first identification information authenticated by the collation device agrees with a first comparison data corresponding to the first identification information and the second identification information authenticated by the second collation device agrees with a second comparison data corresponding to the second identification information.

17. An immobilizer device according to claim 16, wherein the engine ECU further includes a request signal transmitting device which inputs a request signal containing random numbers generated by the random number generator to the immobilizer ECU,
the immobilizer ECU further includes a transmitting device which transmits the request signal,
the password generating device of the key receives the request signal containing the random numbers and generates the first identification information as a function of the random numbers, and
the first collation device of the engine ECU is configured to authenticate the first identification information which is generated as the function of the random numbers.

18. An immobilizer device according to claim 17, wherein the immobilizer device is configured such that the request signal, the first identification information and the second identification information are transmitted between the engine ECU and the immobilizer ECU via a single serial communication line.

19. An immobilizer device according to claim 16, wherein the immobilizer ECU is adapted to be disposed with an ignition switch unit near a top bridge of a motorcycle, and the engine ECU is adapted to be disposed inwardly of the vehicle nearer to an engine of the vehicle than the immobilizer ECU.

20. An immobilizer device according to claim 16, wherein the power source includes at least one of a battery, a coil which receives electric waves from the immobilizer ECU, and a capacitor which rectifies an electric current generated by the coil and stores the electric current as DC power therein.

* * * * *